United States Patent [19]
Kähkipuro

[11] Patent Number: 4,894,765
[45] Date of Patent: Jan. 16, 1990

[54] BI-DIRECTIONAL D.C./D.C. CONVERTER COMPATIBLE WITH AN INVERTER BRIDGE

[75] Inventor: Matti Kähkipuro, Hyvinkää, Finland

[73] Assignee: Kone Elevator GmbH, Finland

[21] Appl. No.: 361,661

[22] Filed: May 31, 1989

Related U.S. Application Data

[63] Continuation of Ser. No. 139,093, Dec. 22, 1987, abandoned.

[30] Foreign Application Priority Data

Dec. 22, 1986 [FI] Finland .................................. 865280

[51] Int. Cl.$^4$ ............................................. H02M 7/00
[52] U.S. Cl. ......................................... 363/124; 307/20;
307/28; 307/46; 307/75; 323/224; 323/266
[58] Field of Search ....................... 307/20, 28, 46, 75;
323/222, 224, 266; 363/124

[56] References Cited

U.S. PATENT DOCUMENTS

| | | | |
|---|---|---|---|
| 4,085,358 | 4/1978 | Holcomb | 363/16 |
| 4,161,023 | 7/1979 | Goffeau | 363/124 |
| 4,401,895 | 8/1983 | Petkovsek | 307/66 |
| 4,459,537 | 7/1984 | McWhorter | 323/224 |
| 4,618,812 | 10/1986 | Kawakami | 323/266 |
| 4,727,308 | 2/1988 | Huljak et al. | 323/222 |
| 4,736,151 | 4/1988 | Dishner | 323/224 |
| 4,801,859 | 1/1989 | Dishner | 323/224 |

FOREIGN PATENT DOCUMENTS 3443809 6/1986 Fed. Rep. of Germany .

Primary Examiner—Patrick R. Salce
Assistant Examiner—Jeffrey L. Sterrett
Attorney, Agent, or Firm—Lowe, Price, LeBlanc, Becker & Shur

[57] ABSTRACT

In a method of and apparatus for connecting a storage battery to an elevator inverter, the storage battery being connected to a d.c. circuit of the elevator inverter power stage, a voltage in the d.c. circuit is higher than the battery voltage. Power flows bidirectionally from the storage battery to the d.c. circuit and vice versa. When power is flowing from the storage battery to the d.c. circuit, the battery voltage is matched to the voltage in the d.c. circuit by the aid of a semiconductor switch, by means of which an energy store is charged, and a diode, by which the energy in the energy store is discharged into the d.c. circuit. When power is flowing from the d.c. circuit to the storage battery, the voltage of the d.c. circuit is matched to the battery voltage with the aid of a second semiconductor switch, by means of which the energy store is charged, and a second diode, by which the energy in the energy store is discharged into the storage battery.

28 Claims, 5 Drawing Sheets

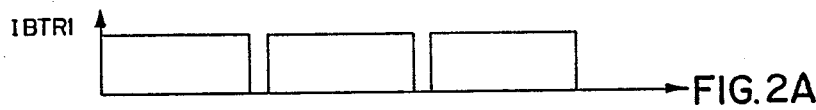
FIG. 2A
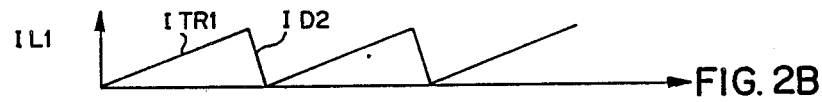
FIG. 2B
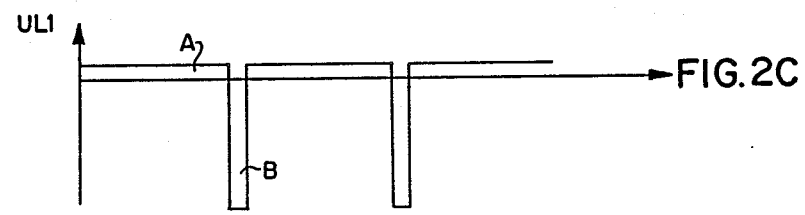
FIG. 2C
FIG. 2D
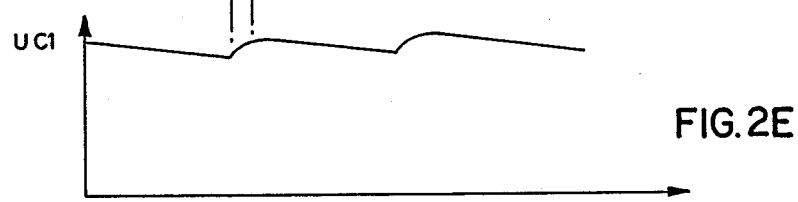
FIG. 2E

BI-DIRECTIONAL D.C./D.C. CONVERTER COMPATIBLE WITH AN INVERTER BRIDGE

This is a continuation of application Ser. No. 139,093, filed Dec. 22, 1987, now abandoned.

FIELD OF THE INVENTION

The present invention relates to a method of and an apparatus for connecting a storage battery to an elevator inverter, the storage battery being connected to a d.c. circuit of a power stage of the elevator inverter.

DESCRIPTION OF THE RELATED ART

With respect to elevator motors, elevator technology is shifting towards transistor-controlled frequency converters and a.c. motors. In this connection, the use of a storage battery as an auxiliary power source and energy supply to level out the starting currents has become a salient point. Designers are faced with the problem that large batteries are required. The obvious location for insertion of the extra power storage battery is in the intermediate voltage circuit of the inverter, that is, the d.c. circuit supplying the transistors. However, since the intermediate voltage is rather high, a great number of battery cells is required. For instance, several automobile batteries, which represent a battery type that is advantageous in other respects, are needed in an auxiliary power system of this kind. Another problem arises from the wide variation of the battery voltage in dependence on load conditions. This impedes the proper operation of the transistor/inverter circuit.

BRIEF SUMMARY OF THE INVENTION

It is accordingly an object of the present invention to eliminate the above-mentioned drawbacks.

According to the present invention, there is provided a method of connecting a storage battery to the d.c. circuit of an elevator inverter power stage in which the voltage of the d.c. circuit is higher than the battery voltage, power flows bidirectionally from the battery to the d.c. circuit and vice versa and while power flows from the battery to the d.c. circuit, the battery voltage is matched with the voltage in the d.c. circuit by the aid of a first semiconductor switch, which is used to charge an energy store, and a first diode, by which the energy in this store is discharged into the d.c. circuit, and, while power is flowing from the d.c. circuit to the battery, the voltage of the d.c. circuit is matched with the battery voltage using a second semiconductor switch, by means of which an energy store is charged, and a second diode, by which the energy contained in the energy store is discharged into the storage battery.

Thus, the invention enables any battery voltage to be matched with a given, higher inverter intermediate voltage. Moreover, the voltage variations of the storage battery are not transmitted so as to adversely affect the intermediate voltage. The method according to the invention also permits bidirectional power flow.

The method preferably includes employing an inductance as the energy store and also preferably includes turning on the first semiconductor switch, which is conductive during the time when power is flowing from the storage battery to the d.c. circuit, when the voltage in the d.c. circuit is lower than a reference value and turning on the second semiconductor switch, which is conductive during the time when power is flowing from the d.c. circuit to the storage battery, when the voltage in the d.c. circuit is higher than a reference value.

Apparatus according to the present invention for connecting a storage battery to the d.c. circuit of an elevator inverter power stage, the battery voltage of the storage battery being lower than the voltage in the d.c. circuit, and the apparatus including an energy store, includes, for matching the battery voltage to the d.c. circuit voltage when power is flowing from the storage battery to the d.c. circuit, a first semiconductor switch by means of which the energy in the energy store can be discharged in to the d.c. circuit. For matching the voltage of the d.c. circuit to the battery voltage when power is flowing from the d.c. circuit to the storage battery, the apparatus includes a second semiconductor switch, through which the energy store can be charged, and a second diode, through which the energy in the energy store can be discharged into the storage battery.

In a preferred embodiment the energy storing means comprise an inductance. Also this embodiment, includes control unit means for providing control signals for turning on the first semiconductor switch, which is conductive when power is flowing from the storage battery to the d.c. circuit, when the voltage in the d.c. circuit is lower than a reference value, and control unit means for providing control for providing control signals for turning on the second semiconductor switch, which is conductive when power is flowing from the d.c. circuit to the storage battery, when the voltage in the d.c. circuit is higher than a reference value.

BRIEF DESCRIPTION OF THE INVENTION

Further objects, features and advantages of the present invention will be apparent from the following description thereof when taken in conjunction with the accompanying drawings, in which:

FIG. 2a shows a graph of the base current of the transistor conducting when power is flowing from the storage battery to the d.c. circuit;

FIG. 2b shows a graph of the current in the inductance during the time when power is flowing from the storage battery to the d.c. circuit.

FIG. 2c shows a graph of the voltage across the inductance during the time when power is flowing from the storage battery to the d.c. circuit.

FIG. 2d shows a graph of the working phases during the time when power is flowing from the storage battery to the d.c. circuit.

FIG. 2e shows a graph of the variation of the voltage in the inverter's d.c. circuit for a given constant load when the energy is being supplied by the storage battery.

FIG. 4a shows a graph of the operation of the voltage converter with an intermittent current.

DESCRIPTION OF THE PREFERRED EMBODIMENT

Figure 1:
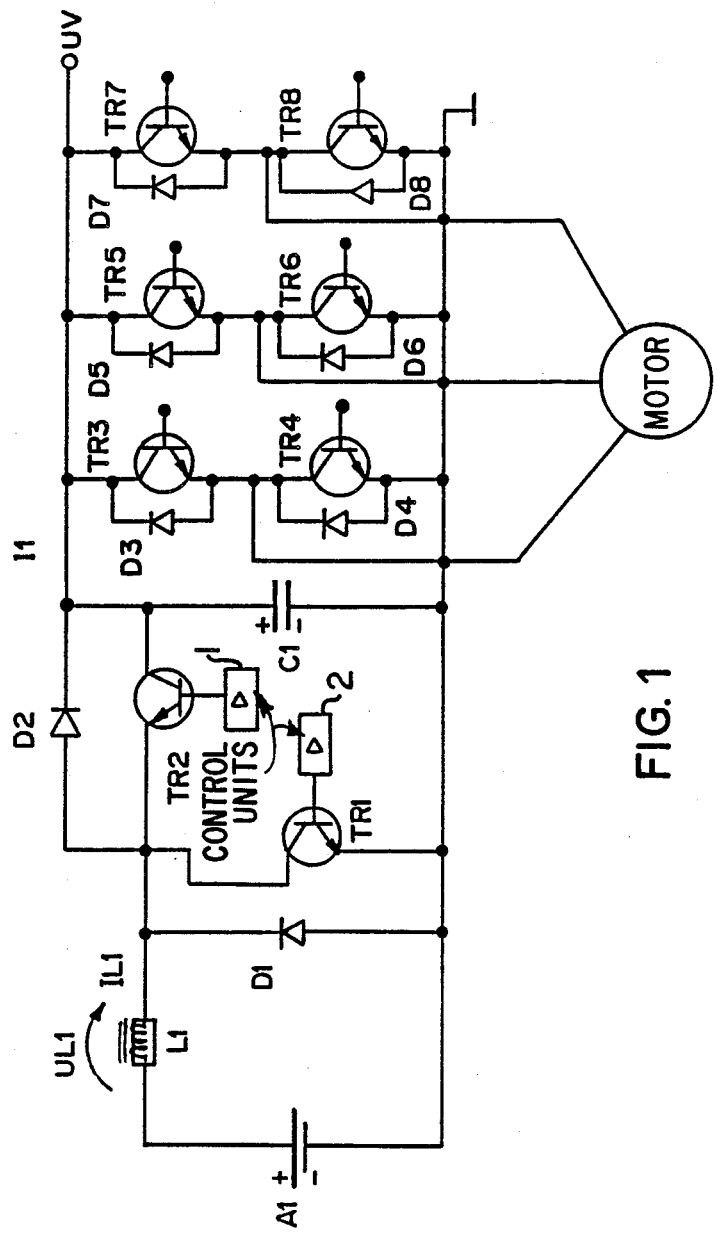
FIG. 1 shows an elevator motor drive comprising an elevator motor, a transistor inverter for energizing the elevator motor and a storage battery connected to the d.c. circuit of the inverter.

FIG. 1 presents an elevator motor drive comprising a squirrel-cage motor M1 used as the elevator motor, a transistor inverter supplying the motor M1 and a battery A1 connected to the d.c. circuit of the inverter. The transistor inverter consists of transistors TR3–TR8 and diodes D3–D8. The design and control arrangements of this kind of inverter comprise technology known to those skilled in the art; therefore, the inverter is not described in detail in the following. It is typical of the elevator motor M1 that it rotates in both directions and that positive as well as negative torques occur in both directions of rotation when the elevator accelerates or brakes between floors.

As shown in FIG. 1, the battery A1 is connected to the intermediate circuit of the inverter, that is, to the d.c. circuit of the inverter power stage, which supplies the transistors T3–T8, and in which the voltage is Uv. The d.c. circuit contains a filtering capacitor C1. The voltage Uv of the d.c. circuit is higher than the storage battery voltage existing between the terminals of the storage battery A1. The requisite voltage matching between the battery A1 and the d.c. circuit is effected by a converter composed of first and second transistors TR1 and TR2, diodes D1 and D2 and an inductance L1. In the converter, two parts are distinguished. The power flow is bidirectional, whereby power may flow from the battery A1 to the d.c. circuit or vice versa, because when the elevator is in operation current flows in the inverter in both directions: from the motor M1 to the d.c. circuit, and vice versa. When power is flowing from the battery A1 to the d.c. circuit, the battery voltage is matched to equal the voltage Uv of the d.c. circuit by means of the first transistor TR1, through which the inductance L1, acting as an energy store, is charged, and by the diode D2, through which the energy in the inductance L1 is discharged into the d.c. circuit. When power is flowing from the d.c. circuit to the battery A1, the voltage Uv of the d.c. circuit is matched to equal the battery voltage by means of the second transistor TR2, through which the inductance L1 is charged, and by second diode D1, through which the energy in the inductance is discharged into the storage battery A1. The first transistor TR1 is controlled by the control unit 1, and the second transistor TR2 by the control unit 2.

FIGS. 2a–2e illustrate the way in which power is drawn from the storage battery A1. The horizontal axis is the time axis, as it also is in FIGS. 3, 4a, 4b and 5a–5e.

FIG. 2a shows the base current IBTR1 of the transistor TR1 conducting when power is flowing from the storage battery A1 to the d.c. circuit. FIG. 2b shows the current IL1 in the inductance and FIG. 2c shows, the voltage UL1 across the inductance during the same time. The inductance current IL1 is composed of the transistor current ITR1 and the diode current ID2.

In FIG. 2c, the areas A and B have to be equal for the flux of the inductance L1 to be stable. The voltage transformation ratio is indicated by the ratio of the conduction times T1 and T2 of transistor TR1 and diode D2 prevailing during the working phases presented in FIG. 2d, that is, during the time when power is flowing from the battery A1 to the d.c. circuit. In the present case, the battery voltage is 50 V and the voltage of the d.c. circuit Uv=500 V.

FIG. 2e shows the variation of the voltage UC1 across the capacitor in the d.c. circuit of the inverter for a given constant load when the energy is being supplied by the storage battery A1.

Figure 3:
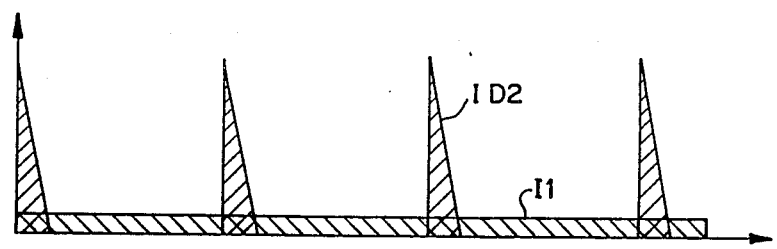
FIG. 3 shows a graph of the current of the diode conducting when power is flowing from the storage battery circuit to the d.c. circuit and current is drawn by the inverter.

FIG. 3 shows the current ID2 of the diode, which is conducting while power is flowing from the storage battery A1 to the d.c. circuit, and the current I1 drawn by the inverter. Owing to the transformation ratio, the diode current ID2 is substantially larger than the current I1 drawn by the inverter.

Figure 4B:
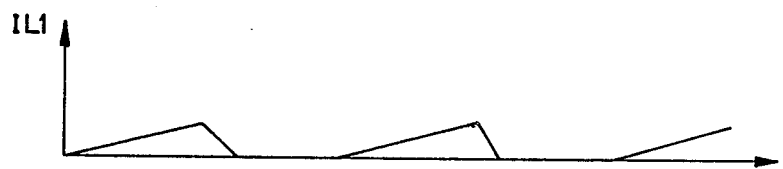
FIG. 4b shows a graph of the operation of the voltage converter with a continuous current.
Figure 4B:
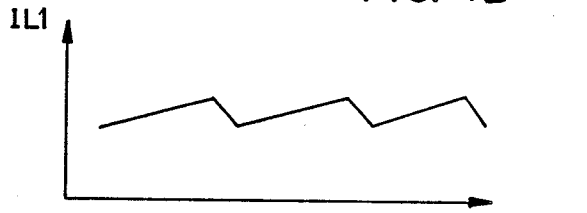

FIG. 4a shows the operation of the converter with an intermittent inductance current IL1 and FIG. 4b, that with a continuous current.

FIGS. 5a–5e show the curve shapes when energy is being transferred from the d.c. circuit to the storage battery A1.

Figure 5A:
FIG. 5a shows a graph of the base current of the transistor which is conductive when power is flowing from the d.c. circuit to the storage battery.
Figure 5B:
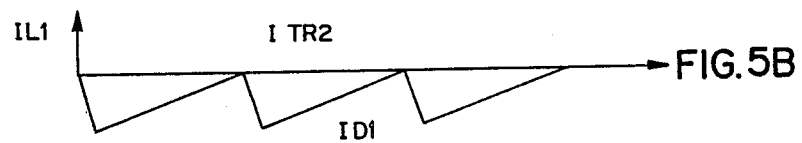
FIG. 5b shows a graph of the current in the inductance during the time when power is flowing from the d.c. circuit to the storage battery.
Figure 5C:
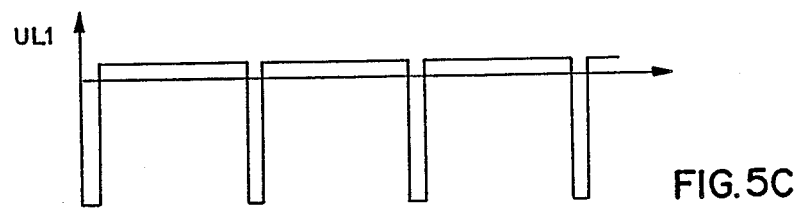
FIG. 5c shows a graph of the voltage across the inductance during the time when power is flowing from the d.c. circuit to the storage battery.

FIG. 5a shows the base current IBTR2 of the second transistor during the time in question, and FIG. 5b the inductance current IL1 during the time when power is flowing from the d.c. circuit to the storage battery A1. The inductance current IL1 consists of the transistor current ITR2 and the diode current ID1.

Figure 5D:
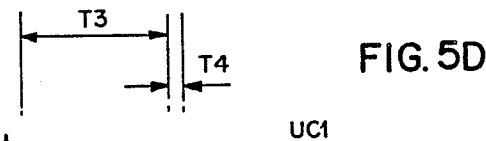
FIG. 5d shows a graph of the working phases during the time when power is flowing from the d.c. circuit to the storage battery.

FIG. 5d illustrates the working phases T3 and T4 during this period. The transistor TR2 is conductive only for a short time T4.

Figure 5E:
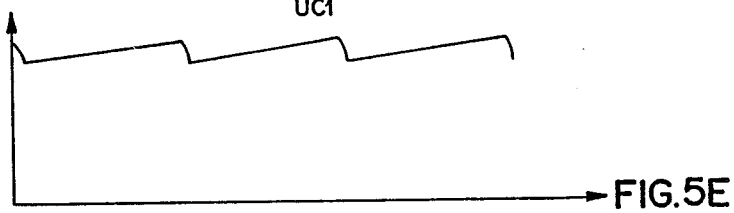
FIG. 5e shows a graph of the voltage variation in the inverter's d.c. circuit for a given constant load when power is flowing from the d.c. circuit to the storage battery.

FIG. 5e shows the variation of the voltage UC1 across the capacitor C1 in the d.c. circuit of the inverter for a given constant load when power is flowing from the d.c. circuit to the storage battery A1. The wave form of the voltage UC1 is different from the waveform in the instance shown in FIG. 2e, in which power is flowing from the storage battery A1 to the d.c. circuit.

During the time when power is flowing from the storage battery A1 to the d.c. circuit, the conducting transistor TR1 is turned on when the voltage Uv of the d.c. circuit is lower than the reference value.

Figure 6:
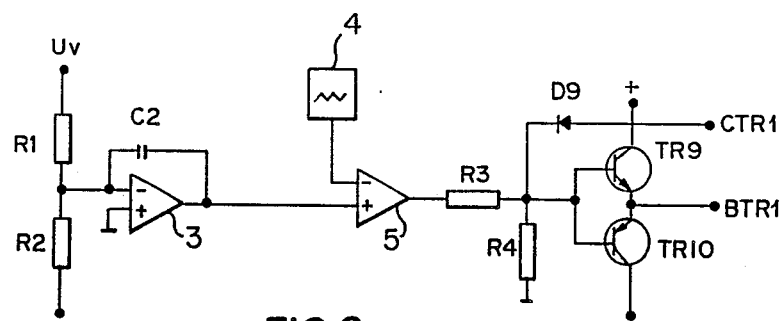
FIG. 6 shows the control circuit for the transistor conducting when power is flowing from the storage battery to the d.c. circuit.

FIG. 6 shows the transistor control unit 1. The grounding of the control unit 1 may be connected at the negative terminal of the d.c. circuit. This obviates the need for galvanic isolation between the transistor TR1 and the control unit 1. The integrator composed of capacitor C2 and operational amplifier 3 detects an undervoltage situation in the level voltage Uv with the aid of a voltage divider consisting of resistors R1 and R2. From the integrator, a signal is passed to a comparator 5, which also receives a triangular wave from the triangular wave generator 4. In the comparator, pulse width modulation is accomplished using these two signals. The level of the current flowing in the converter is determined on the basis of the pulse ration of the signal obtained via pulse width modulation, and the level of the current changes with the pulse ratio. From the comparator 5 the signal is passed through resistor R3 to an intermediate amplifier. The base voltage of transistor TR1 is adjusted to an appropriate level by means of resistor R3 and R4. At the same time so-called Baker diode D9 connected to the transistor collector CTR1 and to the input of the intermediate amplifier is made active. The intermediate amplifier consists of transistors TR9 and TR10 constituting a double emitter follower circuit. The intermediate amplifier controls the base BTR1 of transistor TR1.

During the time when power is flowing from the d.c. circuit to the storage battery A1, the second transistor TR2 is turned on when the voltage Uv in the d.c. circuit is higher than the reference value.

Figure 7:
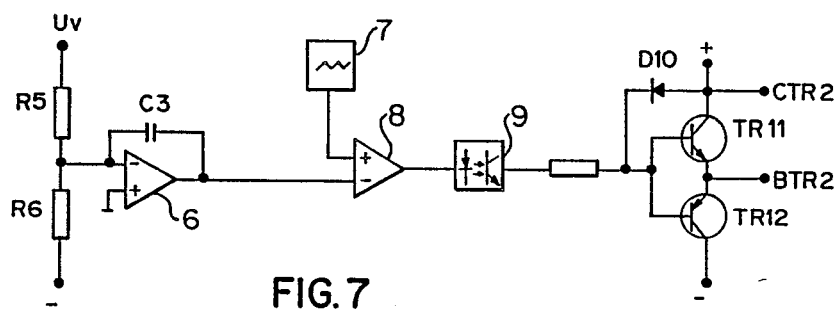
FIG. 7 shows the control circuit for the transistor conducting when power is flowing from the d.c. circuit to the storage battery.

FIG. 7 shows the unit 2 controlling the second transistor. An integrator consisting of a capacitor C3 and an operational amplifier 6 detects any excess voltage situation in the voltage Uv of the d.c. circuit by means of a voltage divider consisting of resistors R5 and R6. Pulse width modulation is passed out as in the control unit 1, in comparator 8, to which a signal from the triangular wave generator 7 is also applied in addition to the signal from the integrator. Isolation of the control electronics galvanically from the d.c. circuit is achieved by means of an optoisolator 9, to which the signal from the comparator 8 is applied. Thereafter, the signal is directed to the intermediate amplifier composed of transistors TR11 and TR12, the transistor base BTR2 being controlled by this intermediate amplifier. The circuit also includes a Baker diode D10.

The apparatus also includes a battery charger for charging the storage battery A1. The use of a battery charger is known to those skilled in the art; therefore, the battery charger is not depicted in FIG. 1, nor is its operation described in greater detail in the present invention.

It will be obvious to those skilled in the art that the embodiments of the invention are not restricted to the example presented in the foregoing, and that they may vary within the scope of the appended claims. The procedure of connecting a storage battery as taught by the invention may be applied simply for smoothing the starting currents. The inverter may obtain its intermediate voltage from e.g. a diode bridge, in addition to the storage battery supply, and the braking energy may also be applied to a braking resistance. Furthermore, the intermediate voltage may be produced by means of transistors in such manner that it also becomes possible to feed energy back into the mains. The intermediate voltage may also be produced by means of transistors.

I claim:

1. A method of connecting a storage battery to a d.c. circuit in a power stage of an elevator inverter, by directly coupling said inverter and a converter, the voltage in said d.c. circuit being higher than the battery voltage, and power flowing bidirectionally from the storage battery to the d.c. circuit and vice versa which method includes the steps of:
   employing a first semiconductor switch and a first diode to cause the battery voltage to at least substantially equal the voltage in the d.c. circuit when power is flowing from the storage battery to the d.c. circuit;
   said first transistor being employed to charge an energy store and said first diode being employed to discharge energy from said energy store to said d.c. circuit; and
   employing a second semiconductor switch and a second diode to cause the voltage of the d.c. circuit to at least substantially equal the battery voltage when power is flowing from the d.c. circuit to the storage battery;
   said second transistor being employed to charge said energy store and said second diode being employed to discharge energy from said energy store to said storage battery.

2. A method according to claim 1, which includes employing an inductance as said energy store.

3. A method according to claim 1, which includes turning on said first semiconductor switch, which is conductive during the time when power is flowing from said storage battery to said d.c. circuit, when the voltage in said d.c. circuit is lower than a reference value.

4. A method according to claim 1, which includes turning on said second semiconductor switch which is conductive during the time when power is flowing from said d.c. circuit to said storage battery, when the voltage in said d.c. circuit is higher than a reference value.

5. Apparatus for directly coupling an inverter and a converter by connecting an elevator inverter, having a power stage which includes a d.c. circuit, to a storage battery having a battery voltage lower than the voltage in said d.c. circuit, said apparatus comprising:
   means for storing energy;
   first voltage matching means for causing said battery voltage to equal the voltage in said d.c. circuit when power is flowing from said storage battery to said d.c. circuit;
   said first voltage matching means comprising first semiconductor switch means for charging said energy storing means and first diode means for discharging energy from said energy storing means to said d.c. circuit; and
   second voltage matching means for causing the voltage of said d.c. circuit to equal said battery voltage when power is flowing from said d.c. circuit to said storage battery means;
   said second voltage matching means comprising second semiconductor switch means for charging said energy storing means and second diode means for discharging energy from said energy storing means to said storage battery means.

6. Apparatus according to claim 5, wherein said energy storing means comprise an inductance.

7. Apparatus according to claim 5, including control unit means for providing control signals for turning on said first semiconductor switch, which is conductive when power is flowing from said storage battery to said d.c. circuit, when the voltage in said d.c. circuit is lower than a reference value.

8. Apparatus according to claim 5, including control unit means for providing control for providing control signals for turning on said second semiconductor switch, which is conductive when power is flowing from said d.c. circuit to said storage battery, when the voltage in said d.c. circuit is higher than a reference value.

9. A method of connecting a storage battery to a d.c. circuit in a power stage of an elevator inverter, without using isolation diodes, pull up resistors or pull down resistors, the voltage in said d.c. circuit being higher than the battery voltage, and power flowing bidirectionally from the storage battery to the d.c. circuit and vice versa which method includes the steps of:

employing a first semiconductor switch and a first diode to cause the battery voltage to at least substantially equal the voltage in the d.c. circuit when power is flowing from the storage battery to the d.c. circuit;

said first transistor being employed to charge an energy store and said first diode being employed to discharge energy from said energy store to said d.c. circuit; and employing a second semiconductor switch and a second diode to cause the voltage of the d.c. circuit to at least substantially equal the battery voltage when power is flowing from the d.c. circuit to the storage battery;

said second transistor being employed to charge said energy store and said second diode being employed to discharge energy from said energy store to said storage battery.

10. A method according to claim 9, which includes employing an inductance as said energy store.

11. A method according to claim 9, which includes turning on said first semiconductor switch, which is conductive during the time when power is flowing from said storage battery to said d.c. circuit, when the voltage in said d.c. circuit is lower than a reference value.

12. A method according to claim 9, which includes turning on said second semiconductor switch which is conductive during the time when power is flowing from said d.c. circuit to said storage battery, when the voltage in said d.c. circuit is higher than a reference value.

13. Apparatus for connecting an elevator inverter, having a power stage which includes a d.c. circuit, to a storage battery having a battery voltage lower than the voltage in said d.c. circuit, said apparatus not including isolation diodes, pull up resistors or pull down resistors, but rather comprising:

means for storing energy;

first voltage matching means for causing said battery voltage to equal the voltage in said d.c. circuit when power is flowing from said storage battery to said d.c. circuit;

said first voltage matching means comprising first semiconductor switch means for charging said energy storing means and first diode means for discharging energy from said energy storing means to said d.c. circuit; and second voltage matching means for causing the voltage of said d.c. circuit to equal said battery voltage when power is flowing from said d.c. circuit to said storage battery means;

said second voltage matching means comprising second semiconductor switch means for charging said energy storing means and second diode means for discharging energy from said energy storing means to said storage battery means.

14. Apparatus according to claim 13, wherein said energy storing means comprise an inductance.

15. Apparatus according to claim 13, including control unit means for providing control signals for turning on said first semiconductor switch, which is conductive when power is flowing from said storage battery to said d.c. circuit, when the voltage in said d.c. circuit is lower than a reference value.

16. Apparatus according to claim 13, including control unit means for providing control for providing control signals for turning on said second semiconductor switch, which is conductive when power is flowing from said d.c. circuit to said storage battery, when the voltage in said d.c. circuit is higher than a reference value.

17. A method of connecting a storage battery to a d.c. circuit in a power stage of an elevator inverter, by directly coupling said inverter and a converter without using isolation diodes, pull up resistors or pull down resistors, without using isolation diodes, pull up resistors or pull down resistors, the voltage in said d.c. circuit being higher than the battery voltage, and power flowing bidirectionally from the storage battery to the d.c. circuit and vice versa which method includes the steps of:

employing a first semiconductor switch and a first diode to cause the battery voltage to at least substantially equal the voltage in the d.c. circuit when power is flowing from the storage battery to the d.c. circuit;

said first transistor being employed to charge an energy store and said first diode being employed to discharge energy from said energy store to said d.c. circuit; and employing a second semiconductor switch and a second diode to cause the voltage of the d.c. circuit to at least substantially equal the battery voltage when power is flowing from the d.c. circuit to the storage battery;

said second transistor being employed to charge said energy store and said second diode being employed to discharge energy from said energy store to said storage battery.

18. A method according to claim 17, which includes employing an inductance as said energy store.

19. A method according to claim 17, which includes turning on said first semiconductor switch, which is conductive during the time when power is flowing from said storage battery to said d.c. circuit, when the voltage in said d.c. circuit is lower than a reference value.

20. A method according to claim 17, which includes turning on said second semiconductor switch which is conductive during the time when power is flowing from said d.c. circuit to said storage battery, when the voltage in said d.c. circuit is higher than a reference value.

21. Apparatus for directly coupling an inverter and a converter by connecting an elevator inverter, having a power stage which includes a d.c. circuit, to a storage battery having a battery voltage lower than the voltage in said d.c. circuit, said apparatus not including isolation diodes, pull up resistors or pull down resistors, but rather comprising:

means for storing energy;

first voltage matching means for causing said battery voltage to equal the voltage in said d.c. circuit when power is flowing from said storage battery to said d.c. circuit;

said first voltage matching means comprising first semiconductor switch means for charging said energy storing means and first diode means for discharging energy from said energy storing means to said d.c. circuit; and second voltage matching means for causing the voltage of said d.c. circuit to equal said battery voltage when power is flowing from said d.c. circuit to said storage battery means;

said second voltage matching means comprising second semiconductor switch means for charging said energy storing means and second diode means for discharging energy from said energy storing means to said storage battery means.

22. Apparatus according to claim 21, wherein said energy storing means comprise an inductance.

23. Apparatus according to claim 21, including control unit means for providing control signals for turning on said first semiconductor switch, which is conductive when power is flowing from said storage battery to said d.c. circuit, when the voltage in said d.c. circuit is lower than a reference value.

24. Apparatus according to claim 21, including control unit means for providing control for providing control signals for turning on said second semiconductor switch, which is conductive when power is flowing from said d.c. circuit to said storage battery, when the voltage in said d.c. circuit is higher than a reference value.

25. A method of connecting a storage battery to a d.c. circuit in a power stage of an elevator inverter, the voltage in said d.c. circuit being higher than the battery voltage, and power flowing bidirectionally from the storage battery to the d.c. circuit and vice versa which method includes the steps of:
employing a first semiconductor switch and a first diode to cause the battery voltage to at least substantially equal the voltage in the d.c. circuit when power is flowing from the storage battery to the d.c. circuit;
said first transistor being employed to charge an inductance as an energy store and said first diode being employed to discharge energy from said energy store to said d.c. circuit;
employing a second semiconductor switch and a second diode to cause the voltage of the d.c. circuit to at least substantially equal the battery voltage when power is flowing from the d.c. circuit to the storage battery; and
turning on said first semiconductor switch, which is conductive during the time when power is flowing from said storage battery to said d.c. circuit, when the voltage in said d.c. circuit is lower than a reference value;
said second transistor being employed to charge said energy store and said second diode being employed to discharge energy from said energy store to said storage battery.

26. A method according to claim 25, which includes turning on said second semiconductor switch which is conductive during the time when power is flowing from said d.c. circuit to said storage battery, when the voltage in said d.c. circuit is higher than a reference value.

27. Apparatus for connecting an elevator inverter, having a power stage which includes a d.c. circuit, to a storage battery having a battery voltage lower than the voltage in said d.c. circuit, said apparatus comprising:
an inductance as a means for storing energy;
first voltage matching means for causing said battery voltage to equal the voltage in said d.c. circuit when power is flowing from said storage battery to said d.c. circuit;
said first voltage matching means comprising first semiconductor switch means for charging said energy storing means and first diode means for discharging energy from said energy storing means to said d.c. circuit;
second voltage matching means for causing the voltage of said d.c. circuit to equal said battery voltage when power is flowing from said d.c. circuit to said storage battery means; and
said second voltage matching means comprising second semiconductor switch means for charging said energy storing means and second diode means for discharging energy from said energy storing means to said storage battery means;
including control unit means for providing control signals for turning on said first semiconductor switch, which is conductive when power is flowing from said storage battery to said d.c. circuit, when the voltage in said d.c. circuit is lower than a reference value.

28. Apparatus according to claim 27, including control unit means for providing control for providing control signals for turning on said second semiconductor switch, which is conductive when power is flowing from said d.c. circuit to said storage battery, when the voltage in said d.c. circuit is higher than a reference value.

* * * * *

UNITED STATES PATENT AND TRADEMARK OFFICE
CERTIFICATE OF CORRECTION

PATENT NO. : 4,894,765

DATED : January 16, 1990

INVENTOR(S) : Matti KAHKIPURO

It is certified that error appears in the above-identified patent and that said Letters Patent is hereby corrected as shown below:

On the title, amend the Assignee information to read as follows:

--[73] Assignee: Kone Elevator Gmbh, Switzerland--.

Signed and Sealed this

Sixth Day of August, 1991

Attest:

HARRY F. MANBECK, JR.

Attesting Officer

Commissioner of Patents and Trademarks